Aug. 4, 1936.   A. U. AYRES   2,050,080
WASTE RENOVATION AND OIL RECLAMATION SYSTEM AND PROCESS
Filed Jan. 30, 1933   2 Sheets-Sheet 1

INVENTOR.
ARTHUR U. AYRES
BY *Maurice A. Crews*
ATTORNEY.

Aug. 4, 1936.　　　A. U. AYRES　　　2,050,080
WASTE RENOVATION AND OIL RECLAMATION SYSTEM AND PROCESS
Filed Jan. 30, 1933　　2 Sheets-Sheet 2

INVENTOR
ARTHUR U. AYRES
BY *Maurice A. Crews*
ATTORNEY

Patented Aug. 4, 1936

2,050,080

UNITED STATES PATENT OFFICE 2,050,080

WASTE RENOVATION AND OIL RECLAMATION SYSTEM AND PROCESS

Arthur U. Ayres, Chestnut Hill, Pa., assignor to The Sharples Specialty Company, Philadelphia, Pa., a corporation of Delaware Application January 30, 1933, Serial No. 654,277

3 Claims. (Cl. 141—2)

The present invention relates to the renovation of car journal oil waste, the purification of used lubricating oil extracted from such waste and to the storage and feed of such oil in the saturation of renovated waste. The invention has as its principal object the development of a process of purifying oils of the type of car journal oil, which effects an efficient purification of such oils to remove solid and liquid impurities such as carbon, dirt, bearing material, fibrous material and water from the oil.

Another object of the invention has been to superimpose upon a system for removing used car journal oil and impurities from waste and washing such waste, a process and apparatus for reclaiming contaminated oil resulting from the removal and washing operations. Another object has been to treat oil in a washing tank in such a system by a process adapted to remove impurities therefrom, and thus maintain the oil in such washing tank in a sufficiently clean condition to properly perform its washing function. A still further object has been to provide a novel arrangement for conserving heat in a storage tank adapted to contain oil which has been reclaimed in accordance with the invention and to feed oil in a properly heated condition to reclaimed waste which is to be resaturated.

Figure 1:
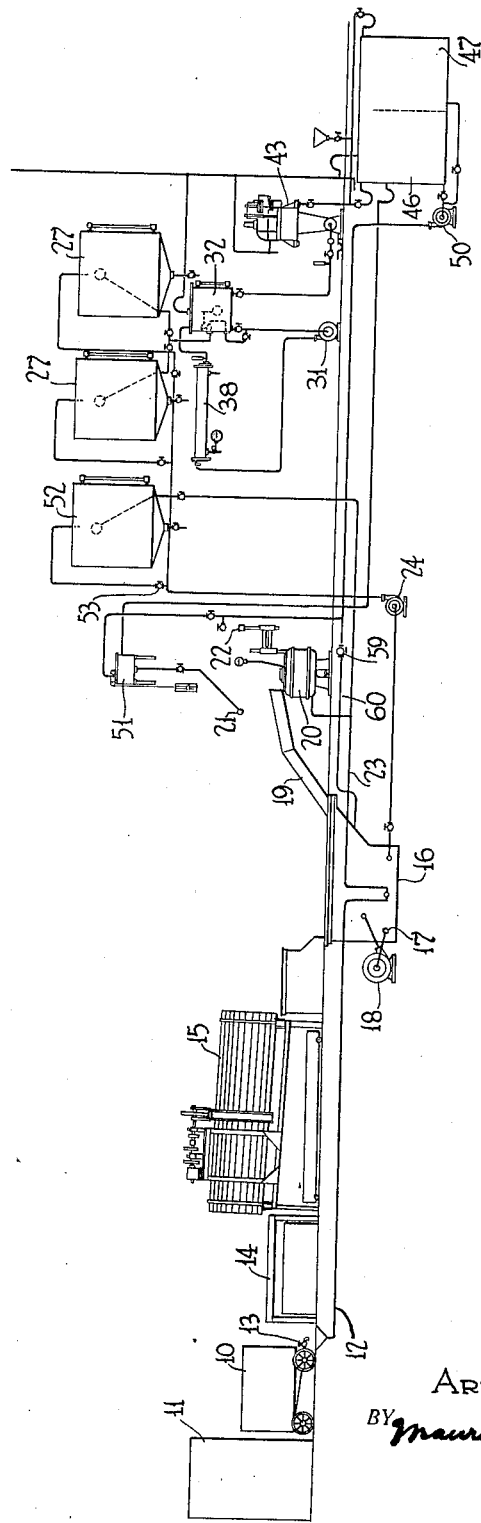
Figure 2:
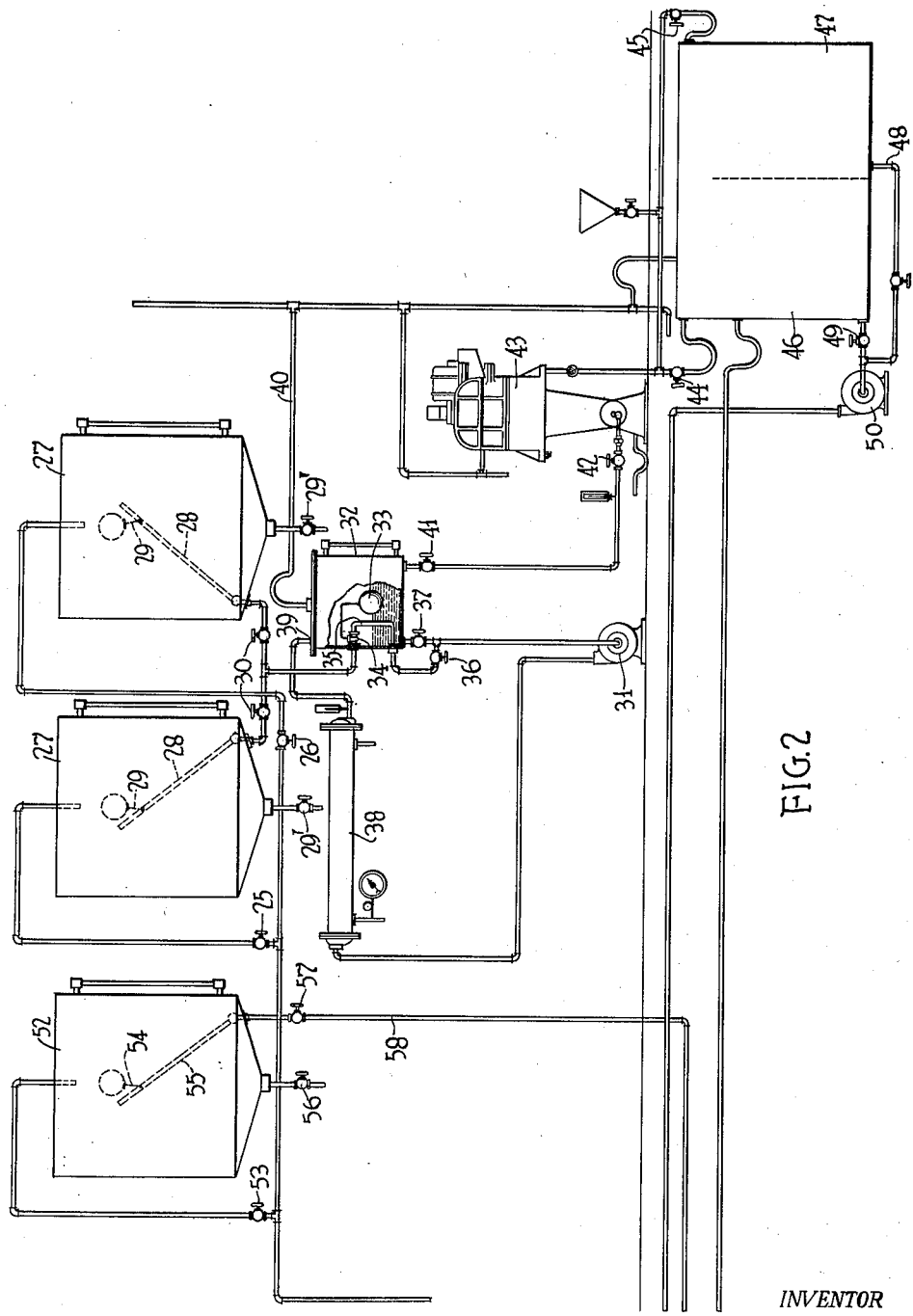

Further objects and advantages of the invention will be obvious from a reading of the following specification in the light of the attached drawings in which Figure 1 is a diagrammatic side elevation of apparatus constituting a system for renovating waste and reclaiming oil collected in the process of waste renovation, and Fig. 2 is a detailed side elevation of a portion of the system.

Referring to the drawings by reference characters, the numeral 10 indicates a hand truck into which used car journal oil waste containing oil and impurities is placed as the first step in the renovation of the waste and reclamation of the oil. These trucks are placed in an oven 11 and retained in that oven for a period of from eight to twenty-four hours at a temperature of approximately 200° F. Each of the trucks is provided with a false bottom upon which the waste rests and a true bottom which is sloped toward one end, in order that the oil and impurities which drain from the waste during the heat treatment may be collected in the lower compartment. At the end of the heat treatment, the trucks are withdrawn one at a time and placed in position over a drain in the floor communicating with a pipe 12 through which impurities which have drained from the oil may flow by gravity into a washing tank 16. Each truck is provided with a valve 13 communicating with the true bottom in order to drain the bottom of the truck at the desired time.

During the draining of the oil from the truck bottom, the waste is transferred to a picking table 14 upon which it may be picked by hand. After this hand-picking operation the waste is transferred to a rotary picker 15 which comprises a tumbler having slatted sides and inwardly projecting spikes which impale the waste. This picker undergoes a rotary movement which causes particles of waste to be alternately carried to the top of the picker and released by the impaling spikes to cause them to drop from the upper portion of the rotary surface to the lower portion thereof, thus shaking coarse particles from the waste and through the slats of the tumbler into a receptacle which underlies it.

The tumbled waste is next transferred to the washing tank 16. This tank is filled with a body of oil which is maintained at a temperature of approximately 140° F. by means of steam coils. A centrifugal pump 18 draws oil from the bottom of the washing tank through a pipe 17 and forces this oil under pressure through the waste which is carried upon a support which is immersed in the upper part of the tank. This passage of heated oil through the waste agitates the waste and facilitates the removal of impurities therefrom. The washing tank acts both to remove impurities from the waste and to replace the used oil remaining in the fibers of the waste with oil of a better quality.

After the waste has been washed as described above, for a period of approximately five minutes, it is raked up on a drainboard 19 and allowed to drain for approximately five minutes in order to effect a removal of excess oil therefrom.

After the draining operation the waste is placed in the perforated basket of a centrifugal extractor 20. The extractor is first run at high speed for a brief period in order to remove oil from the waste by a centrifugal force and reduce the oil content of the waste until it contains a small and uniform quantity of oil. The speed of rotation of the extractor basket is carefully regulated during this period in order that the waste may contain a regulated quantity of oil at the conclusion of the extraction of oil therefrom. Oil removed from the waste in this operation is returned to the washing tank through the pipe 23.

The extractor is next connected to a source of fresh oil supply through connections 21, 22 and run at materially reduced speed during the feed of fresh oil thereto from its center. This feed is maintained until a measured quantity of oil has been fed to, and absorbed by, the waste, and is thereafter discontinued. The speed of rotation during this phase of the operation is likewise controlled. This rotation is continued after the feed of a measured quantity of re-saturating oil to the centrifuge until the discharge of a very small quantity of oil from the waste is noted. By operating in this manner, the operator is enabled to assure himself that the waste is substantially completely and uniformly saturated. The resaturated waste is ready for re-use as journal box packing after it leaves the extractor 20.

In the operation of the system described above, oil is constantly accumulating in the tank 16 by reason of the fact that fresh oil is constantly draining from newly received batches of waste in process of reclamation and being passed through pipe 12 to that tank at a greater rate than the rate of removal of oil from the washing system in the partially saturated waste. It is therefore necessary to remove oil periodically or continuously from the washing tank 16. In the practice of the invention this oil is removed intermittently as it accumulates, and dirty oil is passed from the bottom of the washing tank 16 by means of a centrifugal pump 24 to a system for removing its impurities. This system is best illustrated in Fig. 2 of the drawings.

Oil removed from the tank 16 is passed through valve 25 or valve 26 to the upper portion of one of the settling tanks 27. As this oil is in a heated condition when removed from the tank 16, it is sufficiently fluid to facilitate settling in the tanks 27 to which it is removed. Oil in the tanks 27 is allowed to cool somewhat during the settling period, the addition of heat during this period being avoided in order to avoid the development of convection currents which would otherwise create a turbulence in the settling tank tending to decrease the efficiency of the settling operation. The tanks 27 are preferably alternately used, oil being fed to one tank over a predetermined period of time while the other tank is used as a source of supply of oil to a centrifugal separating portion of the system, which will be described below.

After oil has been stored in one of the tanks 27 for a sufficient time to allow the coarse solids and a certain amount of water to settle to the conical bottom of the particular tank in use for this purpose, valve 29' controlling the discharge of sludge from this tank is opened for a brief period to allow the settled impurities to be drawn off. The valve 30 controlling the discharge of oil from the tank which is to be used as the source of supply for the centrifugal portion of the reclaiming system is then opened to allow the flow of oil to centrifugal feed tank 32. Oil flows from tank 27 through a swinging draw-off pipe 28 controlled by a float arm 29 and passes through a float-controlled valve 34 through centrifugal feed tank 32 and valve 36 to a heater 38, the oil feed through this portion of the system being maintained by a centrifugal pump 31. It is to be noted that oil passing from settling tank 27 passes through the centrifugal feed tank 32 in an enclosed pipe 35 and that there is no contact during this feed between this oil and the oil which has already accumulated in the centrifugal feed tank. The oil is heated to a temperature of approximately 300° F. in the heater 38 and is passed from this heater to the top of the centrifugal feed tank, as indicated at 39. Float 33 controls the operation of float-controlled valve 34 and thus regulates the feed of additional oil from the settling tank to the centrifuge feed system after the accumulation of oil to a predetermined level in the tank 32. The elevation of the temperature of the oil to a point well above the boiling point of water and its subsequent feed to the top of the tank 32, which is vented by the pipe 40, effectively removes water and volatile impurities therefrom as set forth in the patent to Ambler No. 1,926,188.

An important feature of the present invention consists in the continuous maintenance of a feed of oil from the centrifuge feed tank 32 through the heater 38, regardless of the rate of feed to the feed tank. Thus, oil flows from the bottom of the tank 32 through the valve 37 and returns to the top of the tank 32, regardless of the rate of feed of oil from tank 27 to the centrifuge feed system under control of the valve 34. A continuous feed of oil is thus maintained through the heater 38, the temperature of the oil in the tank 32 being maintained at the desired point by this continuous external feed through the heater, even at times when flow through the valve 34 is so considerably restricted by the elevation of the float 33 that the oil in tank 32 might otherwise become too cool. Hot oil will pass from the feed tank 32 to the centrifuge 43 through valves 41 and 42, the rate of centrifuge feed being controlled by the control of the valve 42. The centrifuge 43 is provided with a clarifier type of bowl and solid impurities of such a fine nature as to resist separation in the gravity settling operation effected in the tank 27 are removed by being thrown to the imperforate wall of this bowl.

Purified oil is continuously discharged from the clarifier bowl and fed to storage tanks or compartments 46 or 47 through valves 44 or 45. These storage compartments are preferably arranged in heat exchange relationship with respect to each other. Oil is periodically removed from one of the storage compartments through conduit 48 or 49 by means of centrifugal pump 50 and fed to a small oil containing receptacle 51 from which it is fed to the extracting and saturating centrifuge 20 in carefully regulated quantities. In this connection, operation in accordance with the preferred embodiment of the invention involves alternate feed of oil to compartments 46 and 47. During the feed of oil to compartment 46, oil for resaturation is removed from compartment 47 and vice versa. By this method of operation a supply of oil for resaturating extracted waste is maintained at a temperature sufficient to insure a degree of fluidity which facilitates the resaturation. On the other hand, the passage of oil from the compartment to which heated oil is not being currently fed effectively avoids the danger that oil may be applied to the waste at such a high temperature as to burn the waste. By arranging the storage compartments in heat exchange relationship with each other and feeding resaturating oil from the compartment to which oil is not being currently fed, it is therefore possible to insure the use of oil in the resaturating operation which is substantially cooler than that leaving the centrifuge 43 and which is yet sufficiently hot to maintain the fluidity desired in the resaturating operation.

In the above discussion the operation of an oil reclamation system in which oil is thoroughly purified, has been described. In addition to this thorough purification of oil removed from the washing tank intermittently or continuously in small increments, it is desirable that a substantial proportion or all of the oil in the washing tank be periodically removed therefrom and subjected to a settling operation to effect the removal of the coarser impurities from this oil. A substantial amount of oil is accordingly periodically fed from the washing tank through the pump 24 and valve 53 to the upper part of the settling tank 52, this oil being retained in that tank for a substantial length of time sufficient to allow the majority of the solid and liquid impurities in the oil to settle in the form of a sludge, to the conical bottom of that tank. The settling operation in this tank is similar to that in tank 27 in that the hot oil is allowed to cool during the settling period. At the conclusion of this period the sludge is withdrawn through the valve 56 and the purified oil is returned through the swinging draw-off pipe 55 under control of a float arm 54 and through the valve 57 and pipe 58 to the washing tank. Oil may be fed to the tank 52 in any desired quantities, but the preferred method of operation in accordance with the invention, involves a periodic feed of substantially all of the oil in the tank 16 to this settling tank. By removing the major part of the oil in this manner the washing tank 16 may be thoroughly cleaned before the return of the purified oil from the tank 52. Such periodic removal and coarse reclamation may be conveniently performed at the conclusion of each day's operation of the washing tank, the settling operation taking place during the night, and the reclaimed oil being returned to the washing tank in preparation for its normal operation on the succeeding day.

While a system has been described embodying a fine separation of impurities from oil removed from the washing tank in small increments and a coarse separation of impurities from the main body of the oil after its periodic removal from that tank, it is to be understood that other methods of operation in which varying quantities of oil are fed to the coarse removal system and the fine removal system, fall within the broad spirit of the invention. It will also be understood that the invention is not limited in its application to a process involving the removal of oil from the washing tank for the separation of fine particles at a rate substantially equal to that at which impure oil accumulates in that tank. An alternative process by which oil is removed from the tank 16 at a greater rate than that at which it accumulates in that tank from the dirty waste, falls equally within the spirit of the invention. If such a system of operation is adopted, it is preferred to pass oil from one of the compartments 46, 47, through valve 59 and pipe 60 directly back to the washing tank 16 in order to replace the excess of oil removed from the tank 16 with clean oil.

Still other modifications fall within the spirit of the invention.

I claim:

1. The method of washing a fibrous material to effect removal of solid and liquid impurities therefrom which comprises subjecting such fibrous material to the washing action of an oil bath in a tank and avoiding accumulation of excessive proportions of solid and liquid impurities in said washing tank by removing a portion of the oil from the main body thereof in the tank in increments, subjecting the oil so removed to settling, heating and centrifuging operations to effect a fine purification thereof, returning a part of the oil so purified to the main body thereof in the washing tank, periodically removing substantially all of the oil from the washing tank and effecting a purification thereof and returning said last mentioned oil to the washing tank subsequent to its purification.

2. The method of washing a fibrous material to effect removal of solid and liquid impurities therefrom which comprises subjecting such fibrous material to the washing action of an oil bath in a tank and avoiding accumulation of excessive proportions of solid and liquid impurities in said washing tank by removing a portion of the oil from the main body thereof in the tank in increments, subjecting the oil so removed to settling, heating and centrifuging operations to effect a fine purification thereof and returning a part of the oil so purified to the main body thereof in the washing tank.

3. The method of washing a fibrous material to effect removal of solid and liquid impurities therefrom which comprises subjecting such fibrous material to the washing action of an oil bath in a tank and avoiding accumulation of excessive proportions of solid and liquid impurities in said washing tank by removing a portion of the oil from the main body thereof in the tank in increments, subjecting the oil so removed to a settling operation during cooling of the oil, heating the oil partially purified by the settling operation, centrifuging the heated oil to effect a fine purification thereof and returning a part of the oil so purified to the main body thereof in the washing tank.

ARTHUR U. AYRES.